United States Patent
Shi

(10) Patent No.: US 9,747,564 B1
(45) Date of Patent: Aug. 29, 2017

(54) AIRCRAFT MAINTENANCE AND INSPECTION WITH DATA ANALYTICS ENHANCEMENT

(71) Applicant: The Boeing Company, Chicago, IL (US)

(72) Inventor: Fong Shi, Bellevue, WA (US)

(73) Assignee: The Boeing Company, Chicago, IL (US)

(*) Notice: Subject to any disclaimer, the term of this patent is extended or adjusted under 35 U.S.C. 154(b) by 23 days.

(21) Appl. No.: 15/042,647

(22) Filed: Feb. 12, 2016

(51) Int. Cl.
*G06Q 10/06* (2012.01)
*G06T 7/00* (2017.01)
*G07C 5/00* (2006.01)
*G06N 99/00* (2010.01)

(52) U.S. Cl.
CPC ....... *G06Q 10/0631* (2013.01); *G06N 99/005* (2013.01); *G06T 7/001* (2013.01); *G06T 7/0008* (2013.01); *G07C 5/006* (2013.01); *G06T 2207/20081* (2013.01); *G06T 2207/20221* (2013.01); *G06T 2207/30252* (2013.01)

(58) Field of Classification Search
CPC .............. G06Q 10/0631; G06N 99/005; G06T 7/0008; G06T 7/001; G06T 2207/20081; G06T 2207/20221; G06T 2207/30252; G07C 5/006
See application file for complete search history.

(56) References Cited

U.S. PATENT DOCUMENTS

| 4,587,617 A | 5/1986 | Barker et al. | |
| 5,828,969 A * | 10/1998 | Chamney | B64F 5/40 702/35 |
| 8,255,170 B2 * | 8/2012 | Kollgaard | G06F 11/2294 702/188 |
| 8,401,729 B2 * | 3/2013 | Rouyre | B64F 5/60 701/1 |
| 8,958,945 B2 * | 2/2015 | Ovens | B64F 5/00 701/14 |
| 2016/0253576 A1 * | 9/2016 | Kilpatrick | G06K 9/6215 382/103 |

FOREIGN PATENT DOCUMENTS

EP    2 828 645    1/2015

* cited by examiner

*Primary Examiner* — Todd Melton
(74) *Attorney, Agent, or Firm* — Smith Moore Leatherwood LLP

(57) ABSTRACT

A system and method for analyzing aircraft operation and maintenance history in light of maintenance reports, aircraft type system failure history, health management reports, and aircraft exterior structural conditions to produce a real time recommendation regarding aircraft maintenance and dispatch. A visual inspection report is generated by capturing a real time image of an exterior of the aircraft, inverting the real time image, superimposing the real time image on a previous image of the aircraft exterior, and detecting any variation on the combination of superimposed inverted image on the previous image of the aircraft exterior. Aircraft type historical systems failure reports are analyzed to identify any predictive latent system failure of the aircraft based on the aircraft type historical systems failure report and aircraft operation history and maintenance history.

22 Claims, 5 Drawing Sheets

AIRCRAFT MAINTENANCE AND INSPECTION WITH DATA ANALYTICS ENHANCEMENT

TECHNOLOGICAL FIELD

The present disclosure relates generally to aircraft inspection and maintenance and, in particular, to an improved system and method for using data analytics to optimize aircraft inspections and maintenance.

BACKGROUND

In the aviation industry, aircraft inspections and maintenance are typically scheduled after a period of operation time or flight hours, or when predetermined flight cycles have been reached. The inspection and maintenance processes are comprehensive and ongoing. For example, certain aircraft components are replaced upon reaching a maximum allowable usage, while other parts are periodically checked for field failures or faulty performance. Airlines and airworthiness authorities often refer to scheduled inspections as A-check, B-check, C-check, or D-check, wherein A-checks and B-checks are considered to be lighter checks, and C-checks and D-checks are considered to be heavier checks. As illustrated in FIG. 1, at an airport gate, for example, airline crewmembers may conduct a ground inspection and assessment 102 of parked aircraft. Such ground assessment, also known as an airport ramp inspection, involves checks on airplane structure and system components for visible damages caused by aging, wear and tear, deterioration due to the environment, strikes by birds, lightening, or foreign objects debris, etc. The procedure is performed in accordance with flight crew operation manuals 104 including pilot operation handbooks, regulatory updates 106, crewmember knowledge 108, and other information provided by the aircraft manufacturer and operating airlines.

Typically, it is the responsibility of the airlines ground crew to make a decision 110 on whether the aircraft is airworthy before pushback for departure. In preparation for flight, items on a checklist, both interior and exterior, are inspected. Discovery of any safety issues, and correction or deferment of such issues, is essential for ensuring a safe flight. Since the Federal Aviation Administration (FAA) adopted the operation concept of a minimum equipment list (MEL), flights are allowed with certain inoperative items, as long as such items are nonessential in flight. Thus, within the FAA MEL guidelines, airlines may defer repairs of certain nonessential equipment. For inoperative equipment found during inspection, a decision is made as to whether the aircraft is safe for departure 120, whether maintenance 112 is needed prior to departure, whether flight can be made under the limitations imposed by the FAA MEL rules regarding deferment 122, or whether the flight needs to be cancelled 114. The flight crew and maintenance engineering crews are notified of the status 116, 118, and all information is documented in log books 124 and maintenance records 126.

With the above-described inspection and maintenance processes, on-the-spot flight safety decisions heavily depend on the skills, knowledge, experience and level of training received by the individuals of the airline crewmembers who are working around the aircraft to perform ground inspections. During the inspections, airplane instrument, sensors, probes, brakes, pressure vents, engine blades, fluid level, cracks, and corrosions, etc., are subject to crewmembers' interpretations. Additionally, some inspections are conducted at night or at other times during poor visibility, which increases the likelihood that a safety issue could be misinterpreted or misjudged during inspection. Examples include obstructed probes by insect nests, worn-out brake pins, partially shut vents, twisted engine blades, fluid leaks, lightening strikes having caused holes, cracks, or dents on top of fuselage, corrosion of antennas, lost of fasteners, and color of the over pressure relief caps, etc. Inevitably, there have been reported incidents traced back to errors and improper judgment by humans.

In some newer and more advanced aircraft, the aircraft include onboard real-time health management systems, referred to as Airplane Health Management (AHM) systems, which enable fleet-wide monitoring of the aircraft while in flight. AHM systems give airlines additional capabilities to monitor onboard systems and components, thereby enabling efficient fleet operations for the airlines with optimized flight planning and flight management. For example, AHM systems aggregate the data, identify potential issues, update maintenance manuals, and provide service and repair related information supplied by aircraft manufacturer systems and engineering experts. AHM summary reports can be sent via to ground stations then routed to airline operation centers for processing. Data going through such channels can be costly to some airlines if the amount becomes huge and the speed of data transmissions can be an issue. As an alternative, AHM summary reports can also be stored on a recorder for later retrieval at the airport either wirelessly or manually.

With onboard and off-board broadband connectivity, large volumes of accumulated aviation service data are becoming available for airlines to assist fleet maintenance, airplane inspections, and repairs on the ground. Airline crewmembers may have access to this database through an internet infrastructure or cloud-based servers to assist their decision-making. Predictive analytics or other machine-assisted methods are capable of extracting true values from volumes of data. Accurate processing of such big data leads to confident decisions, and better decisions means greater operational efficiency and reduction of costs and risks for the airlines. With data analytics enhanced inspection and maintenance, airline crew are able to assess the situation in real time and make correct decisions on-the-spot, thereby enhancing the safety of the flying public, the crewmembers, and the airplanes.

One downside of the above-described AHM system is that it does not combine and integrate all relevant in-service maintenance data among an aircraft manufacturer's aircraft portfolios. Rather, airlines typically keep their fleet inspection results and maintenance data from each other. Unless major incidences occur that operators must report per FAA rules, aircraft maintenance data is only available on a voluntary basis. Due to geographical diversity and differences in culture, languages and data format, current maintenance records of inspections and repairs performed by worldwide fleet on the ground are not integrated with the aircraft manufacturer's AHM system including data collected in-flight. For non-English speaking countries, airlines maintenance logs are often recorded in foreign languages, which is also incompatible with an AHM system written in English. Thus, using the traditional methods, airlines take time, in some case up to a week, to make necessary actions.

Thus, it is desirable to have an improved system and method for integrating and analyzing the contents collected from ground maintenance and inspection with an onboard AHM system to improve accuracy with diagnosis of safety issues and timeliness of the appropriate responses to such issues.

BRIEF SUMMARY

In view of the foregoing background, example implementations of the present disclosure provide a system and method for method for making an aircraft dispatch decision including the step of collecting a plurality of aircraft information in the system, such as maintenance bulletins for the aircraft, repair and maintenance history of the aircraft, a health management report of the aircraft, a structural health management report of the aircraft, an operation history of the aircraft, and a visual inspection report of an exterior of the aircraft. The visual inspection report is generated by capturing a real time image of an exterior of the aircraft, inverting the real time image, superimposing the real time image on a previous image of the aircraft exterior, and detecting any variation on a combination of superimposed inverted image on the previous image of the aircraft exterior. The visual inspection report can also be generated by capturing a real time image of an exterior of the aircraft and comparing the real time image with a previous image of the aircraft exterior using digital processing techniques such as contrast enhancement, compression, noise filtering, edge detection, intensity equalization, gray-level differences, texture-tone analysis, shape and features analysis, color histogram, and pixel-based identity checks. The real time and previous images of the exterior of the aircraft are correlated with other aspects of the aircraft information, which may be machine translated and text segmented.

The method for making an aircraft dispatch decision further includes the step of the system analyzing the aircraft information to detect whether there is a structural or system failure of the aircraft and identify any immediate or near term bulletin maintenance requirement, or a combination thereof. An analysis report is generated based on results from the analyzing step, and the analysis report is documented on a maintenance record for the aircraft. The method further includes the step of the system making an aircraft dispatch decision based on the analysis report. The dispatch decision may include actions such as maintenance action, flight cancellation, flight crew notification, maintenance engineering notification, departure approval, and grounding action.

In additional implementations of the present disclosure, the plurality of aircraft information further includes an aircraft type historical systems failure report, and the analyzing step further includes identifying any predictive latent system failure of the aircraft based on the aircraft type historical systems failure report and aircraft operation and maintenance history. The step of making an aircraft dispatch decision may include the step of analyzing the results of a cumulative learning process, which analyzes known sets of accurate aircraft data, test sets of aircraft data, and probabilities of expected outputs. The output of the cumulative learning module may classify the aircraft systems and the aircraft dispatch decision step may be further based on analysis of information from a plurality of aircraft of the same aircraft type in a fleet.

The system for implementing the foregoing-described steps comprises both hardware and software.

The features, functions and advantages discussed herein may be achieved independently in various example implementations or may be combined in yet other example implementations, further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
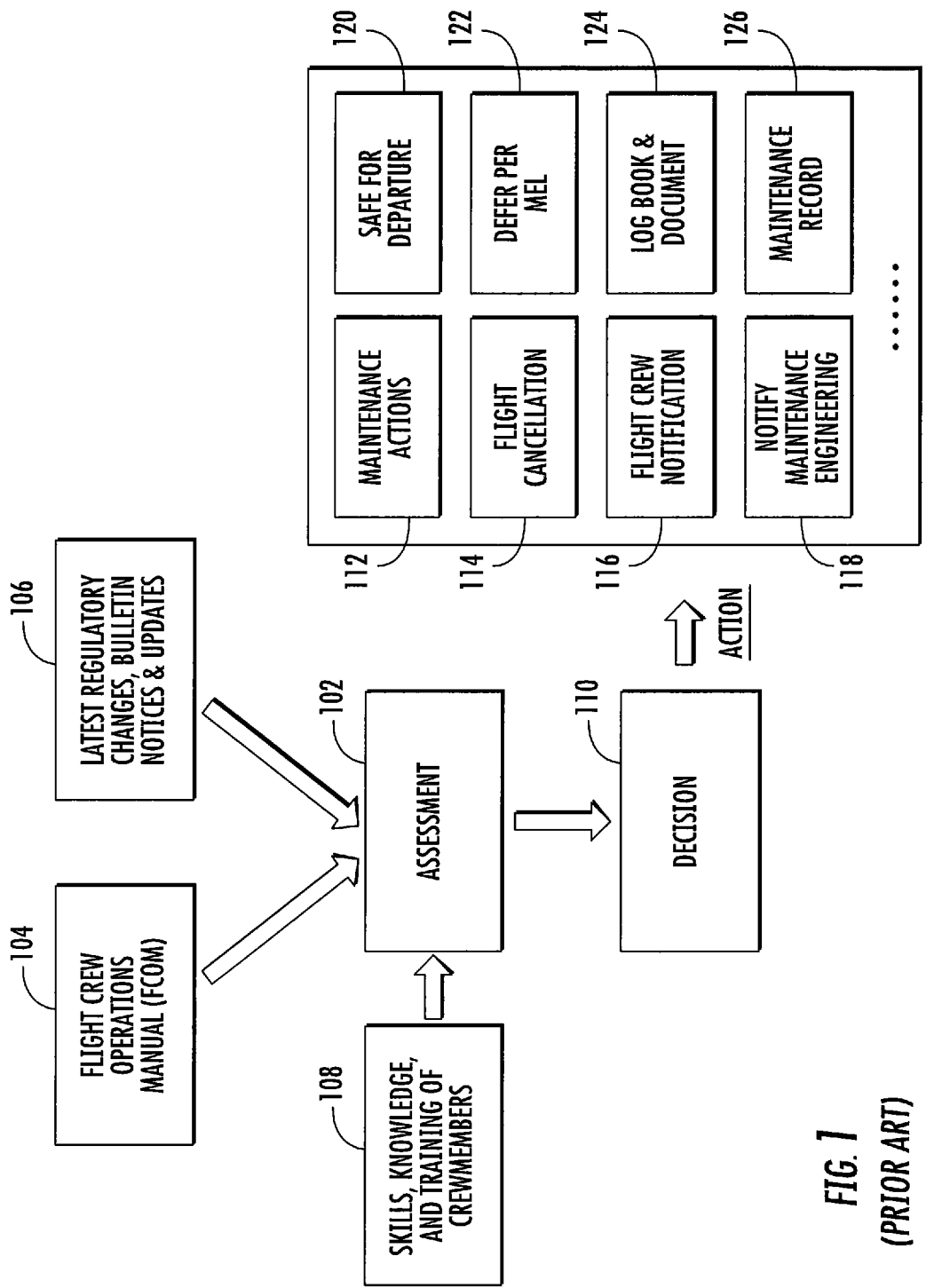
FIG. 1 is a block diagram of a prior art system for making aircraft field service decisions.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure will be primarily described in conjunction with aviation applications. It should be understood, however, that example implementations may be utilized in conjunction with a variety of other applications, both in the aviation industry and outside of the aviation industry.

According to example implementations of the present disclosure, an improved system is provided for integrating and analyzing data collected from ground-based maintenance and inspection with an onboard AHM system to improve accuracy with diagnosis of safety issues and timeliness of the appropriate responses to such issues.

Figure 2:
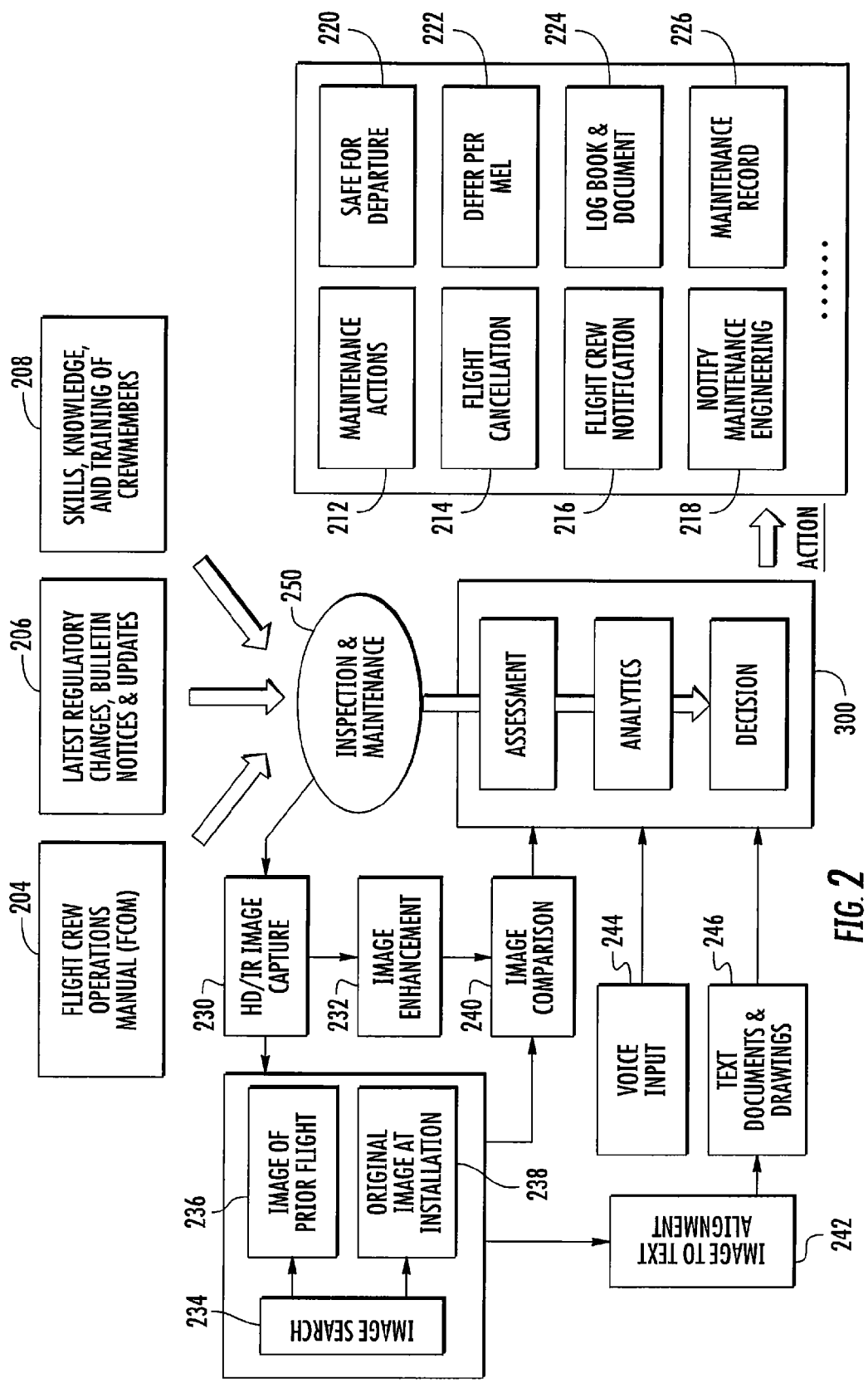
FIG. 2 is a block diagram of a system for making aircraft field service decisions in accordance with an example implementation of the present disclosure.
Figure 3:
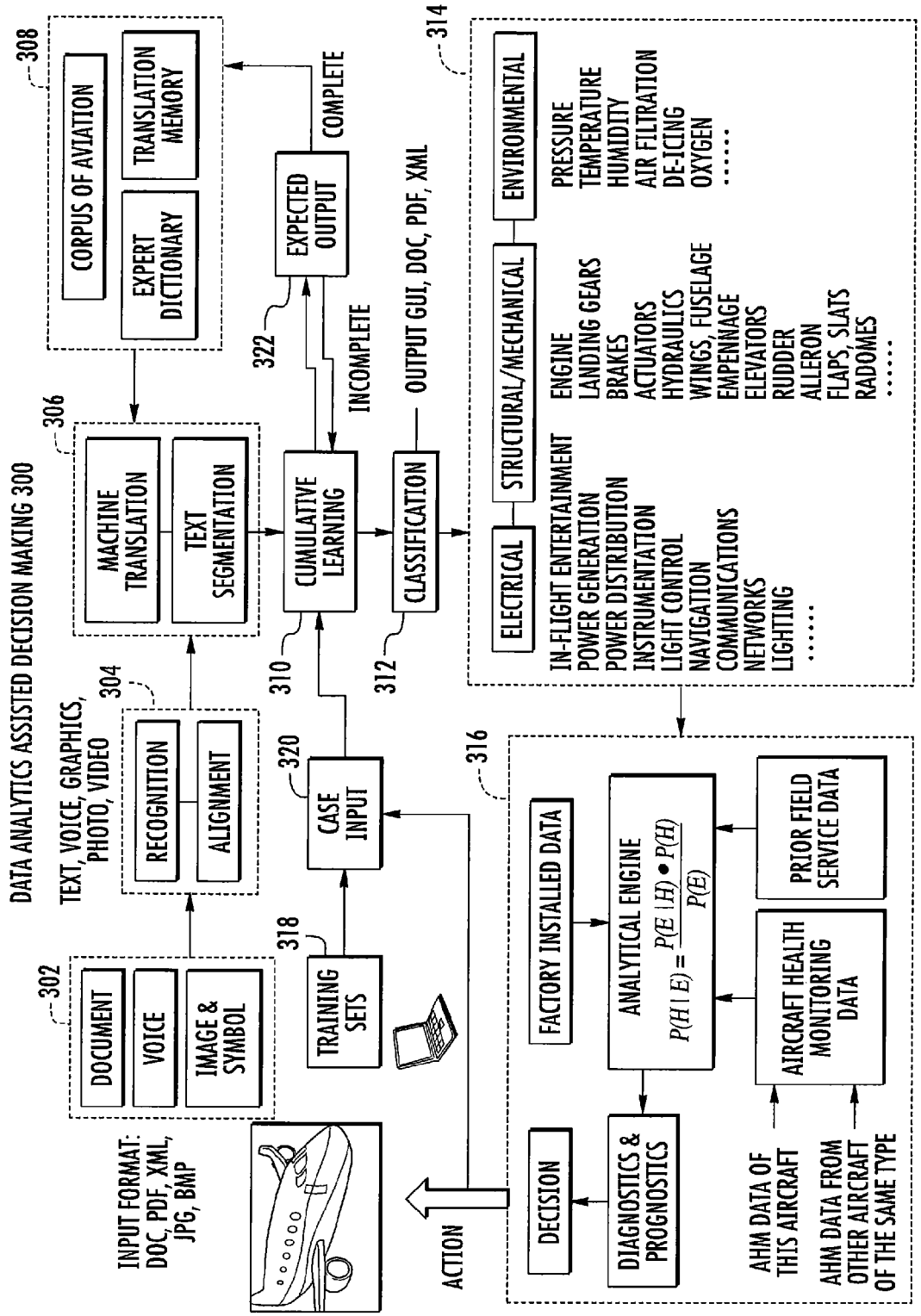
FIG. 3 is a block diagram of data analytics module used in a system for making aircraft field service decisions in accordance with an example implementation of the present disclosure.

As illustrated in FIGS. 2 and 3, in the system and method of the present disclosure, in-service maintenance data and in-flight data are processed at the same time at the same location, with the help of knowledge sharing among all airlines flying the same type airplane elsewhere. The proposed method enables airlines to diagnose safety issues and initiate necessary actions within hours, rather than the weeks required by those traditional analysis methods as referenced above with respect to FIG. 1, thereby improving safety while saving time, fuel, resources, and cost.

On the ground, with the worldwide internet infrastructure such as corporate networks and/or cloud based services, airlines are be able to perform advanced data analytics by accessing the aircraft manufacturer's AHM system through, for example, a web-based portal. This allows airline maintenance crew and technicians to conduct and perform more advanced and complete data analytics on the spot. This integrated approach enhances diagnostics and prognostics much more effectively. Thus, the airline can make better and faster correct-fix-or-fly decisions and reduce flight delays, air turn-backs, and diversions before pushback of an airplane at the gate.

Referring more specifically now to FIG. 2, the system and method of the present disclosure also incorporates a ground inspection 250 of the parked aircraft, similar to the ground inspection and assessment 102, which are conducted by crewmembers. Such ground assessment is performed in accordance with flight crew operation manuals 204 including pilot operation handbooks, regulatory updates 206, crewmember knowledge 208, and other information provided by the aircraft manufacturer and operating airlines.

The present system and method, however, further incorporates intelligence from imaging of the aircraft. Specifically, the crewmembers may capture digital images of the aircraft 230 and use known technology to greatly enhance the images 232. Such images are digitally compared 240 to a database of existing images relevant to the aircraft. The images in the database may be searched 234 and may include images of the aircraft taken when the aircraft was placed in service, at the time of installation 238 or replacement of certain parts, or after previous flights 236. The digital comparison of the present and past images helps the crewmembers to determine whether or how much a particular part of the aircraft has changed. For high-definition and/or infrared images, the processing and comparison may involve determining the similarity of two sets of data through contrast enhancement, compression, noise filtering, edge detection, intensity equalization, gray-level differences, texture-tone analysis, shape and features analysis, color histogram, and/or pixel-based identity checks. Techniques such as image inversion and superposition may also be employed. Intensity equalization can be applied before inverting an image by adding an inverted image onto the image to be compared. If the superposition results of two data sets are net zero, or near zero, then there is no or virtually no difference between the two images. Stated another way, a signature of an object may be inverted and then added to its previous signature of the same object. If the two signals cancel each other, there is no change in the object. Other techniques such as color histograms, numerical weighs assignment, and math processing such as Fourier transfer and cosine inversion can also be implemented. Texture measures may consider co-occurrence matrices, gray-level differences, texture-tone analysis, and features derived from the Fourier spectrum, and Gabor filters.

The system and method of the present disclosure has an additional ability to align the images 242 in the image database with text, such as text from the flight crew operations manuals, maintenance manuals, and service updates. As explained in more detail below, a module 300 for assessing, analyzing, and making a decision on the health of the aircraft factors in the ground-based inspection 250, the image comparisons 240, the text, documents, and drawings that are aligned with the images 242, 246, and voice input 244. The assessment, analytics, and decision module 300 ultimately makes recommendations on airworthiness. Particularly, for inoperative equipment found during inspection, a decision is made as to whether the aircraft is safe for departure 220, whether maintenance is needed prior to departure 212, whether flight can be made under the limitations imposed by the FAA MEL rules regarding deferment 222, or whether the flight needs to be cancelled 214. The flight crew and maintenance engineering crews are notified of the status 216, 218, and all information is documented in log books 224 and maintenance records 226.

Referring now to FIG. 3, the assessment, analytics, and decision module 300 is depicted in more detail. The module 300 input includes the documents, voice, images and symbols 302 that are referenced in FIG. 2. The module 300 also recognizes and aligns such text, graphics, photos, and videos 304 as described above with respect to FIG. 2. The module 300 further provides machine translation and text segmentation functions 306 based on a corpus of aviation data 308 including expert database and translation memory.

The module 300 of the system and method of the present disclosure incorporates machine learning with acquired new knowledge and experience through a process of cumulative learning 310. The continual learning process may include training sets 318 with known good sets of data, actual case input 320, and probabilities of expected output 322.

An output of the cumulative learning process 310 is a machine classification 312 of onboard systems to which particular objects 314 belong. For example, lighting is classified under the electrical system, brakes are classified under the structural/mechanical system, and temperature is classified under the environmental system.

Decision making, diagnostics and prognostics are preformed by a statistic analysis engine 316 based on knowledge of the subject aircraft and all aircraft of the same type. Fleet information may include data about factory installation of objects, prior field service data, and health monitoring data. Knowledge gained from corrective actions is the input to the cumulative learning module 310. This approach enhances aircraft diagnostics/prognostics much more effectively and accurately with fully interpreted information available. The decision making data is provided to crewmembers using broadband connectivity to assist them with making the right decisions during inspections of the aircraft.

The system and method as described above better equips crewmembers with information needed to make decisions regarding the health of an aircraft, even while performing a ground-based inspection. This decision-making is aided by the ability to download the latest regulatory changes, bulletin notices, reference documents, drawings, and images into the system, while also streaming videos or apps to assist with the decision-making process. The system performs analytical algorithms for diagnostics and verifications, and enables the uploading of images or video to airlines operation centers and flight crew for good records keeping. The system further enables electronic signatures for logbooks. Thus, the system and method of this present disclosure is optimized for both cost and performance benefit to airlines and airports by aggregating aircraft maintenance data with AHM data among a fleet's field and maintenance services portfolios. This provides for more advanced and complete data analytics and enables crew members to identify and address potential aircraft health issues long before the prior art methods.

According to example implementations of the present disclosure, the various components of the improved system and method of the present disclosure may be implemented by various means including hardware, alone or under direction of one or more computer program code instructions, program instructions or executable computer-readable program code instructions from a computer-readable storage medium.

In one example, one or more apparatuses may be provided that are configured to function as or otherwise implement the system and method and respective elements shown and described herein. In examples involving more than one apparatus, the respective apparatuses may be connected to or otherwise in communication with one another in a number of different manners, such as directly or indirectly via a wireline or wireless network or the like.

Generally, an apparatus of exemplary implementation for the present disclosure may include one or more of a number of components such as a processor (e.g., processor unit) connected to a memory (e.g., storage device), as described above. The processor is generally any piece of hardware that is capable of processing information such as, for example, data, computer-readable program code, instructions or the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus). The processor may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory is generally any piece of hardware that is capable of storing information such as, for example, data, computer programs and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory, the processor may also be connected to one or more interfaces for displaying, transmitting and/or receiving information. The interfaces may include a communications interface (e.g., communications unit) and/or one or more user interfaces. The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

The user interfaces may include a display and/or one or more user input interfaces (e.g., input/output unit). The display may be configured to present or otherwise display information to a user, suitable examples of which include a liquid crystal display (LCD), light-emitting diode display (LED), plasma display panel (PDP) or the like. The user input interfaces may be wireline or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the system. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. It will also be understood that one or more functions, and combinations of functions, may be implemented by special purpose hardware-based computer systems and/or processors which perform the specified functions, or combinations of special purpose hardware and program code instructions.

Figure 4:
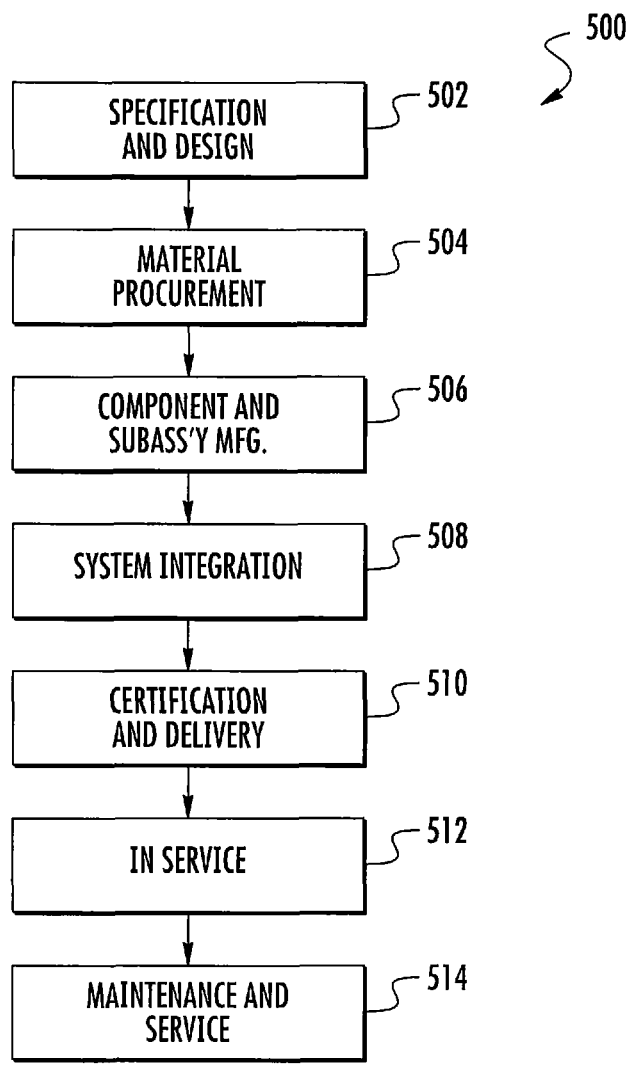
FIG. 4 is a block diagram of aircraft production and service methodology.
Figure 5:
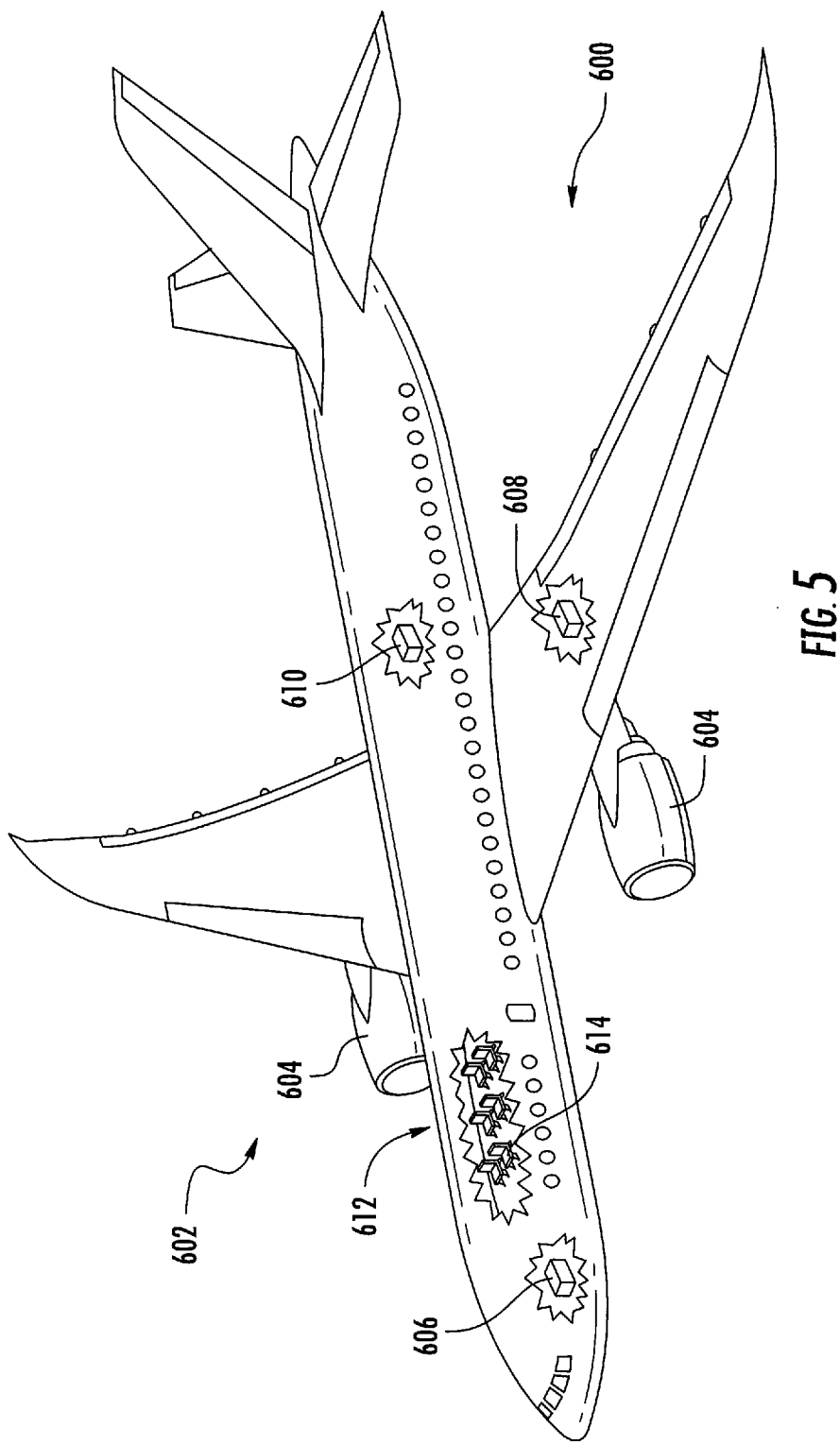
FIG. 5 is a schematic illustration of an aircraft.

As referenced above, examples of the present disclosure may be described in the context of aircraft manufacturing and service. As shown in FIGS. 4 and 5, during preproduction, illustrative method 500 may include specification and design (block 502) of aircraft 602 and material procurement (block 504). During production, component and subassembly manufacturing (block 506) and system integration (block 508) of aircraft 602 may take place. Thereafter, aircraft 602 may go through certification and delivery (block 510) to be placed in service (block 512). While in service, aircraft 602 may be scheduled for routine maintenance and service (block 514). Routine maintenance and service may include modification, reconfiguration, refurbishment, etc. of one or more systems of aircraft 602.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 5, aircraft 602 produced by illustrative method 500 may include airframe 612 with a plurality of high-level systems 600 and interior 614. Examples of high-level systems 600 include one or more of propulsion system 604, electrical system 606, hydraulic system 608, and environmental system 610. Any number of other systems may be included. Although an aerospace example is shown, the principles disclosed herein may be applied to other industries, such as the automotive industry. Accordingly, in addition to aircraft 602, the principles disclosed herein may apply to other vehicles, e.g., land vehicles, marine vehicles, space vehicles, etc.

Apparatus(es) and method(s) shown or described herein may be employed during any one or more of the stages of the manufacturing and service method 500. For example, components or subassemblies corresponding to component and subassembly manufacturing 506 may be fabricated or manufactured in a manner similar to components or subassemblies produced while aircraft 602 is in service. Also, one or more examples of the apparatus(es), method(s), or combination thereof may be utilized during production stages 506 and 508, for example, by substantially expediting assembly of or reducing the cost of aircraft 602. Similarly, one or more examples of the apparatus or method realizations, or a combination thereof, may be utilized, for example and without limitation, while aircraft 602 is in service, e.g., maintenance and service stage (block 514).

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

Many modifications and other implementations of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for making an aircraft dispatch decision comprising the steps of:
   collecting a plurality of aircraft information selected from the group consisting of maintenance bulletins for the aircraft, repair and maintenance history of the aircraft, a health management report of the aircraft, a structural health management report of the aircraft, an operation history of the aircraft, and a visual inspection report of an exterior of the aircraft;
   analyzing the plurality of aircraft information to detect whether there is a structural or system failure of the aircraft and identify any immediate or near term bulletin maintenance requirement, or a combination thereof;
   generating an analysis report comprising results from the analyzing step;
   documenting the analysis report on a maintenance record for the aircraft; and
   making an aircraft dispatch decision based on the analysis report, the dispatch decision comprising decision information selected from the group consisting of maintenance action, flight cancellation, flight crew notification, maintenance engineering notification, departure approval, and grounding action.

2. The method of claim 1 wherein the visual inspection report is generated by capturing a real time image of an exterior of the aircraft and comparing the real time image with a previous image of the aircraft exterior using digital processing techniques selected from the group consisting of contrast enhancement, compression, noise filtering, edge detection, intensity equalization, gray-level differences, texture-tone analysis, shape and features analysis, color histogram, and pixel-based identity checks.

3. The method of claim 2 wherein the visual inspection report is generated by capturing a real time image of an exterior of the aircraft, inverting the real time image, superimposing the real time image on a previous image of the aircraft exterior, and detecting any variation on a combination of superimposed inverted image on the previous image of the aircraft exterior.

4. The method of claim 1 wherein the analyzing step further comprises the step of correlating a real time image of an exterior of the aircraft and a previous image of the aircraft exterior with other aspects of the plurality of aircraft information.

5. The method of claim 1 wherein the step of making an aircraft dispatch decision further comprises the step of performing machine translation and text segmentation on the plurality of aircraft information.

6. The method of claim 1 wherein the step of making an aircraft dispatch decision further comprises the step of analyzing results of a cumulative learning process.

7. The method of claim 6 wherein the cumulative learning process analyzes known sets of accurate aircraft data, test sets of aircraft data, and probabilities of expected outputs.

8. The method of claim 7 wherein an output of the cumulative learning process classifies aircraft systems.

9. The method of claim 1 wherein:
   the plurality of aircraft information further comprises an aircraft type historical systems failure report; and
   the analyzing step further comprises identifying any predictive latent system failure of the aircraft based on the aircraft type historical systems failure report and aircraft operation and maintenance history.

10. The method of claim 9 wherein the making an aircraft dispatch decision step further comprises analyzing information from a plurality of aircraft of the same aircraft type in a fleet.

11. The method of claim 1 wherein the collecting step and analyzing step are performed by a computer comprising hardware and software.

12. A system for making an aircraft dispatch decision comprising:
   a database for storing a plurality of aircraft information selected from the group consisting of maintenance bulletins for the aircraft, repair and maintenance history of the aircraft, a health management report of the aircraft, a structural health management report of the aircraft, an operation history of the aircraft, and a visual inspection report of an exterior of the aircraft;
   an analysis module for:
      analyzing the plurality of aircraft information to detect whether there is a structural or system failure of the aircraft and identify any immediate or near term bulletin maintenance requirement, or a combination thereof;
      generating an analysis report comprising results from the analyzing step; and
      making an aircraft dispatch decision based on the analysis report, the dispatch decision comprising decision information selected from the group consisting of maintenance action, flight cancellation, flight crew notification, maintenance engineering notification, departure approval, and grounding action.

13. The system of claim 12 wherein the visual inspection report is generated by capturing a real time image of an exterior of the aircraft and comparing the real time image with a previous image of the aircraft exterior using digital processing techniques selected from the group consisting of contrast enhancement, compression, noise filtering, edge detection, intensity equalization, gray-level differences, texture-tone analysis, shape and features analysis, color histogram, and pixel-based identity checks.

14. The system of claim 12 wherein the visual inspection report is generated by capturing a real time image of an exterior of the aircraft, inverting the real time image, superimposing the real time image on a previous image of the aircraft exterior, and detecting any variation on a combination of superimposed inverted image on the previous image of the aircraft exterior.

15. The system of claim 12 wherein a real time image of an exterior of the aircraft and a previous image of the aircraft exterior are correlated with other aspects of the plurality of aircraft information.

16. The system of claim 12 wherein the plurality of aircraft information is machine translated and text segmented.

17. The system of claim 12 further comprising a cumulative learning module.

18. The system of claim 17 wherein the cumulative learning module analyzes known sets of accurate aircraft data, test sets of aircraft data, and probabilities of expected outputs.

19. The system of claim 18 wherein an output of the cumulative learning module classifies aircraft systems.

20. The system of claim 12 wherein:
   the plurality of aircraft information further comprises an aircraft type historical systems failure report; and
   the analysis report identifies any predictive latent system failure of the aircraft based on the aircraft type historical systems failure report and aircraft operation and maintenance history.

21. The system of claim 20 wherein the analysis module analyzes information from a plurality of aircraft of the same aircraft type in a fleet.

22. The system of claim 12 wherein the analysis module is a computer comprising hardware and software.

\* \* \* \* \*